United States Patent Office 3,248,954
Patented May 3, 1966

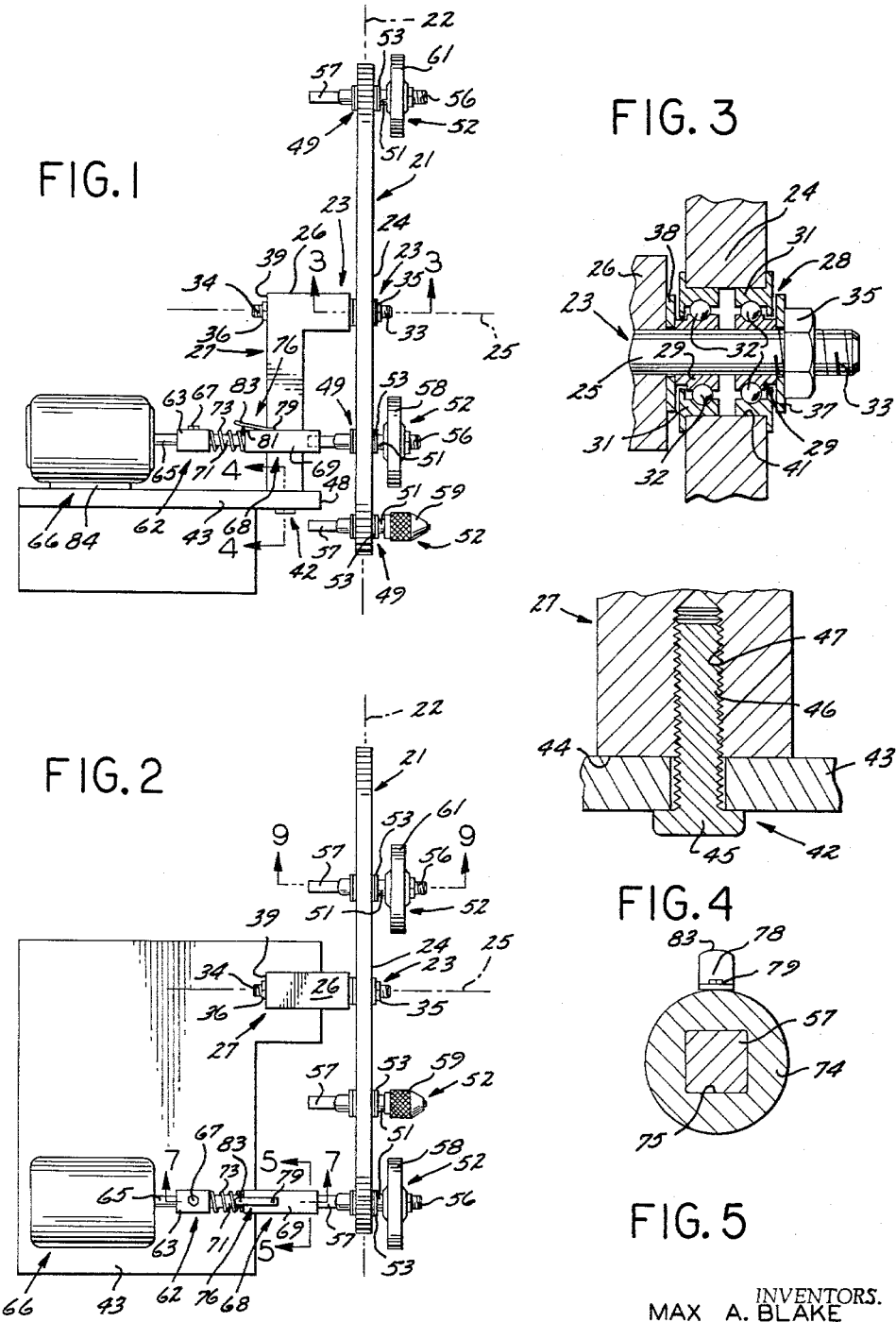

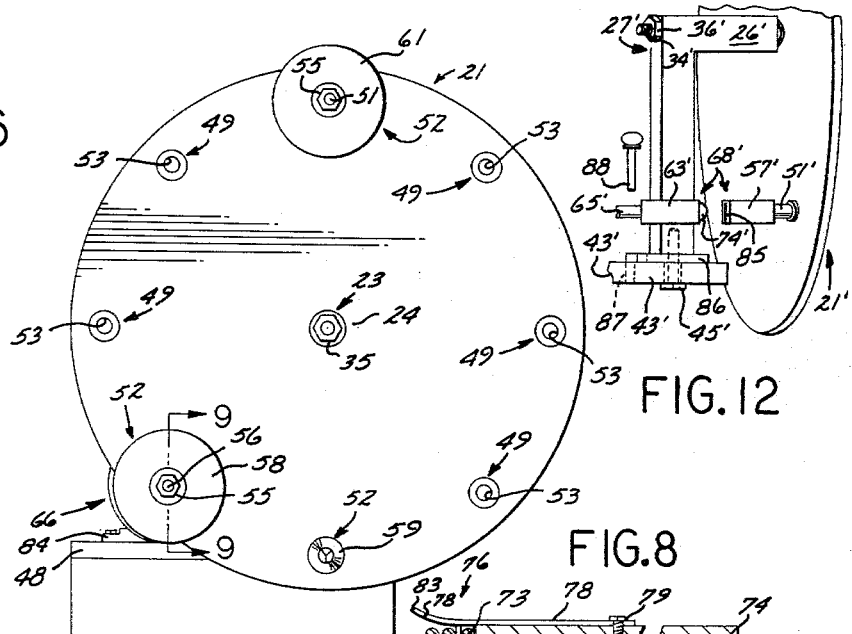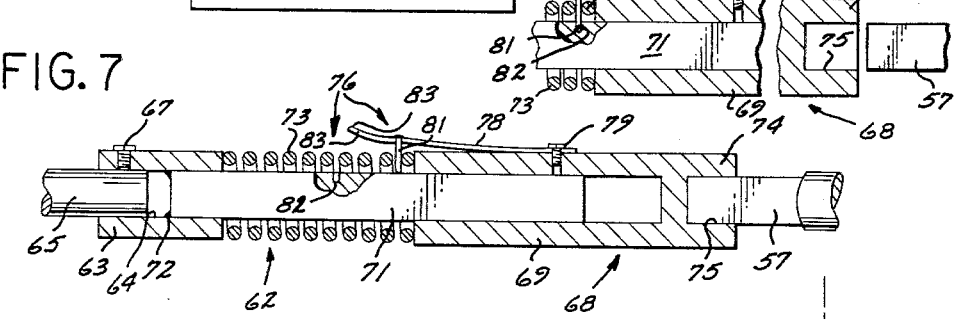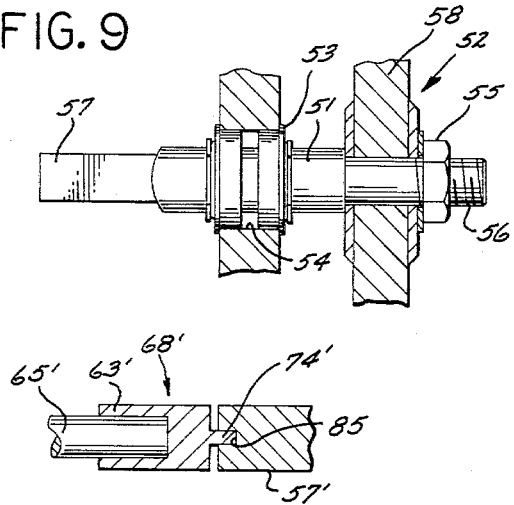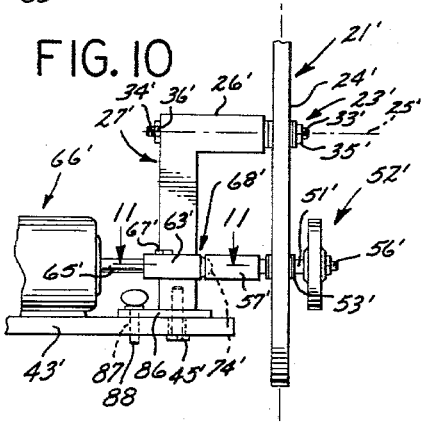

3,248,954
MULTIPLE QUICK-CHANGE ROTARY POWER TOOL MOUNTING AND COUPLING APPARATUS
Max A. Blake, 5124 Verdura, Lakewood, Calif., and Donald W. Howorth, 3234 N. Charlotte Ave., South San Gabriel, Calif.
Filed Feb. 17, 1964, Ser. No. 345,495
15 Claims. (Cl. 74—16)

Generally speaking, the present invention relates to the rotary power tool art and, more particularly, to a multiple quick-change rotary power tool mounting and coupling apparatus for coupling any of a plurality of rotary power tools with respect to an output shaft of a driving motor whereby to effectively rotate the selected rotary power tool so that it may be used for its conventional purposes. The important feature of the invention is the fact that the effective interchanging and coupling of any of a plurality of rotary power tools with respect to the driving motor can be accomplished very easily and quickly and in a manner vastly superior to conventional prior art practice where such changing of a rotary power tool with respect to a driving motor is to be effected.

It should be noted that the present invention is directed to the combination of the multiple quick-change rotary power tool mounting and coupling apparatus with one or more rotary power tools and with a driving motor, and it should further be noted that the invention is also directed to a subcombination thereof comprising just the multiple quick-change rotary tool mounting and coupling apparatus, per se.

With the above points in mind, it is an object of the present invention to provide novel multiple quick-change rotary power tool mounting and coupling apparatus, either in combination with one or more rotary power tools and a driving motor or individually, or per se, and not positively including the driving motor and/or one or more rotary power tools; the apparatus embodying any or all of the features referred to hereinbefore, generically and/or specifically, and either individually or in combination and being of relatively simple, inexpensive, easy-to-mount, and easy-to-use construction capable of mass manufacture at relatively low cost whereby to be conducive to widespread use thereof.

Further objects are implicit in the detailed description which follows hereinafter (which is to be considered as exemplary of, but not specifically limiting, the present invention), and said objects will be apparent to persons skilled in the art after a careful study of the detailed description which follows hereinafter.

For the purpose of clarifying the nature of the present invention, two exemplary embodiments of the invention are illustrated in the hereinbelow-described figures of the accompanying two sheets of drawings and are described in detail hereinafter.

FIG. 1 is a reduced-size side elevational view of one exemplary embodiment of the present invention showing it in mounted operative relationship with respect to an underlying auxiliary supporting member, with the rotary turret wheel means of the apparatus shown as mounting three different exemplary types of rotary power tools and with one of said rotary power tools being shown in effectively coupled and engaged driven relationship with respect to the coupling means of a power transmission means effectively connecting same with respect to a driving motor means whereby to effectively rotate the selected rotary power tool means when the driving motor is energized. In other words, this view shows the apparatus in one exemplary operative relationship of the plurality thereof, any one of which can be selected as desired.

FIG. 2 is a top plan view of the apparatus of FIG. 1.

FIG. 3 is an enlarged fragmentary sectional view taken in the direction of the arrows 3—3 of FIG. 1 and illustrates the pivotal mounting means pivotally or rotatively mounting the rotary turret wheel means relative to the carrying member.

FIG. 4 is an enlarged fragmentary sectional view, taken in the direction of the arrows 4—4 of FIG. 1 and illustrates one exemplary form of connection means connecting the bottom end of the carrying member with respect to an auxiliary horizontal supporting table member or the like.

FIG. 5 is an enlarged fragmentary sectional view, taken in the direction of the arrows 5—5 of FIG. 2, and clearly illustrates one exemplary form of the coupling means carried at the forward end of the power transmission means and adapted to effectively drivingly rotatively couple said power transmission means and the output shaft of the driving motor relative to any selected one of the rotary power tool means carried by the rotary turret wheel means.

FIG. 6 is a front elevational view of the apparatus of FIGS. 1 and 2 as seen from the right side of said figures as they appear in the drawings.

FIG. 7 is an enlarged fragmentary view, partly in section and partly in elevation, taken in the direction of the arrows 7—7 of FIG. 2, and clearly illustrates one exemplary embodiment of the power transmission means (and the coupling means carried at the right or front end thereof) adapted to effectively drivingly connect the output shaft of the driving motor and a selected one of the plurality of rotary power tools for power-rotating same upon energization of the driving motor. This view illustrates the coupling means in effectively drivingly coupled and engaged relationship. In this view, a portion of the power transmission means, otherwise shown in elevation, is illustrated as being partially broken away into a sectional plane in order to clearly illustrate the female receiving portion of a controllably operable catch means of the coupling means adapted to retain the coupling means in a disengaged relationship when said coupling means is slidably moved toward the left from the engaged position shown in FIG. 7 into a disengaged position such as is fragmentarily illustrated in FIG. 8.

FIG. 8 is a fragmentary view generally similar to a portion of FIG. 7, but shows the coupling means in disengaged relationship.

FIG. 9 is an enlarged fragmentary sectional view, taken in the direction of the arrows 9—9 of FIG. 6 and illustrates the rotary mounting of any one of the rotary power tool means with respect to the rotary turret wheel means by effectively rotatively mounting the longitudinal shaft fixedly carrying the power tool means, with respect to the rotary turret wheel means.

FIG. 10 is a fragmentary view generally similar to FIG. 1, but illustrates a slightly modified form of the invention wherein the coupling means of the power transmission means is modified from the first form of the invention illustrated in FIGS. 1–9. This view shows said modified coupling means in fully engaged and effectively drivingly coupled relationship relative to a selected one of a plurality of rotary power tools.

FIG. 11 is an enlarged fragmentary sectional view, taken in the direction of the arrows 11—11 of FIG. 10, and clearly illustrates the detail of the drivingly engaged coupling means.

FIG. 12 is a fragmentary view similar to FIG. 10 but illustrates the modified coupling means in disengaged relationship.

Generally speaking, the exemplary first form of the invention illustrated in FIGS. 1–9 comprises a rotary turret wheel means, indicated generally at 21, which is illustrated in said exemplary first form as being of substantially circular disk-shaped configuration and which is provided with pivotal mounting means pivotally connected to said rotary turret wheel means 21 substantially at the center thereof and rotatively mounting said rotary turret wheel means 21 for rotation around an axis of rotation substantially perpendicular to the plane in which the rotary turret wheel means 21 lies.

In the exemplary first form of the invention illustrated, said rotary turret wheel means 21 lies in a substantially vertical plane, as indicated in broken lines at 22 and, therefore, said pivotal mounting means, indicated generally at 23, pivotally connects the rotary turret wheel means 21 substantially at the center 24 thereof for rotation about a substantially horizontally directed axis of rotation as indicated in broken lines at 25. This comprises one preferred orientation of the rotary turret wheel means 21 and the pivotal mounting means 23, but it should be clearly noted that the invention is not specifically so limited in all forms thereof.

In the exemplary first form of the invention illustrated in FIGS. 1–9, said pivotal mounting means 23 effectively comprises a horizontally directed stud or shaft 25 horizontally mounted by the upper horizontally directed end portion 26 of the downwardly vertically directed carrying member, indicated generally at 27; the forwardly extending end of said stud or shaft 25 carrying the rotary bearing means indicated generally at 28 and comprising the inner bearing member 29, the outer rotary bearing member 31, and the plurality of ball members 32 effectively positioned therebetween in a conventional manner for friction-minimizing purposes.

It should be noted that the inner bearing member 29 is effectively fixedly mounted with respect to the horizontal stud or shaft 25 by reason of the fact that opposite ends thereof are exteriorly threaded as indicated at 33 and 34 and are provided with interiorly threaded clamping and locking nuts 35 and 36, respectively, which are adapted to be threadedly advanced toward each other whereby to positively clamp the end collar 37 in abutment with the right end of the inner bearing member 29, the intermediate collar 38 in abutment with the opposite end of the inner bearing member 29 and with the right end of the upper portion 26 of the carrying member 27. On the other hand, the outer bearing member 31 is not a portion of the clamped structure just mentioned, but is firmly rigidly affixed to the central aperture 41 formed in the center portion 24 of the rotary turret wheel means 21 and is freely rotatable with respect to the inner bearing member 29. This clearly provides for the free and friction-minimized rotation of the rotary turret wheel means 21 with respect to the carrying member 27.

The carrying member 27 is provided with connection means cooperable for rigid connection with respect to an auxiliary supporting member for firmly carrying the rotary turret wheel means 21 in a predetermined operative work region.

In the exemplary first form of the invention illustrated in FIGS. 1–9, said connection means is generally designated by the reference numeral 42, while said auxiliary supporting member is shown as taking the form of a horizontal supporting table member 43 rigidly fastened by said connection means 42 in underlying relationship with respect to the bottom end 44 of said carrying member 27. In said exemplary first form of the invention illustrated said connection means, generally indicated at 24, is shown as taking one exemplary form wherein it comprises a headed upwardly directed exteriorly threaded mounting screw 45 adapted to extend upwardly through an aperture 46 in the horizontal auxiliary table member 43 and into threaded engagement with respect to an interiorly threaded aperture 47 vertically carried in upwardly extending relationship by the bottom end 44 of said carrying member 27.

The arrangement is such that said carrying member 27 can be rigidly clamped in upstanding relationship with respect to said auxiliary supporting table member 43 in a manner such as to mount the rotary turret wheel means 21 in an operative work region which is offset toward the right from the end 48 of said auxiliary supporting table 43 and with said rotary turret wheel means 21 lying in said vertical plane of rotation indicated in broken lines at 22.

In the exemplary first form of the invention illustrated in FIGS. 1–9, said rotary turret wheel means 21 is annularly or circularly provided with a plurality of circularly spaced rotary-power-tool-mounting means, each indicated generally at 49 and each cooperable for receiving and rotatively mounting a horizontally directed longitudinal shaft fixedly carrying a different rotary power tool member for rotation about a horizontal axis substantially parallel to, but radially displaced from, the horizontal axis of rotation of the rotary turret wheel means 21 as indicated in broken lines at the center thereof by the reference numeral 25. In other words, each of the power-tool-mounting means 49 is adapted to receive and mount the longitudinal and horizontally directed shaft 51 of a corresponding one of the plurality of power tool means, each indicated generally at 52, in a manner such as best shown in FIG. 9, wherein an exemplary one of said horizontal shafts 51 is shown as being mounted by rotary and thrust type bearing means, indicated at 53 within a corresponding aperture 54 carried at circularly spaced locations around the rotary turret wheel means 21 similarly radially displaced inwardly from the outer rim thereof as is best shown in FIG. 6. It should be noted that the forward end of each of said power tool shafts 51 is rigidly clamped by threaded fastening means 55 to the threaded outer or forward end 56 of said power tool shaft 51. It should also be noted that the rear end of each of said power tool shafts 51 is provided with a coupling element, such as is most clearly indicated at 57 in FIGS. 5 and 9, the purpose of which will be described hereinafter.

The arrangement is such that any of a plurality of different power tool members, such as the three different exemplary ones indicated at 58, 59, and 61 in FIGS. 2 and 6, can be effectively interchanged with respect to the rotary turret wheel means 21 either by merely unthreading the threaded fastener means 55 from the threaded end 56 of the power tool shaft 51 and removing the power tool member and replacing same with another desired power tool member, or in certain cases the power tool shaft 51 may be removed from the turret wheel means 21 and interchanged and/or replaced if desired in any selected one of the apertures 54.

It will be understood that the arrangement is such that not only is the rotary turret wheel 21 rotatable around the horizontal axis 25, but any one of the rotary power tool means 52 can also be rotated around the horizontal axis of the horizontal power tool shaft 51 thereof.

The invention also includes rotary power transmission means provided with fastening means cooperable for rigid fastening attachment with respect to an output shaft of a driving motor and provided with effectively controllably engageable and disengageable coupling means directed toward the rear surface of the annular or circular portion of the rotary turret wheel means 21 at a radial distance from the pivotal mounting means 23 and the horizontal axis of rotation 25 thereof substantially equal to the radial spacings of each of said rotary-power-tool-mounting means 49 from said axis of rotation 25 of said rotary turret wheel means 21. In other words, the effectively controllably engageable and disengageable coupling means is positioned for selective alignment with the rear coupling element portion 57 at the rear end of any selected one of the horizontal power tool shafts 51 of any of the rotary power tool means 52 for effective coupling engagement and disengagement relative thereto.

In the exemplary first form of the invention illustrated in FIGS. 1–9 said rotary power transmission means is generally designated by the reference numeral 62 and comprises the fastening sleeve 63 having a receiving aperture 64 receiving the end of the driven output shaft 65 of the driving motor 66 and firmly fastened thereto for rotation therewith by the set screw means 67, and further includes the forwardly positioned coupling means generally designated by the reference numeral 68.

In said exemplary first form of the invention, said coupling means 68 comprises a horizontally slidably mounted and centrally apertured member 69 slidably mounted in a non-rotative manner on the rectangular forwardly extending member 71 which is firmly fastened to the front end of the fastening sleeve 63, as indicated at 72, with a compression biasing spring means 73 positioned between the forward end of the fastening sleeve 63 and the rear end of said horizontally apertured slidable member 69 and normally biasing said slidable member 69 toward the forward extreme engaged relationship most clearly shown in FIGS. 5 and 7.

It will be noted that the slidable member 69 is provided at the forward end thereof with an effectively rotatably keyed female coupling element or portion 74 having a non-round aperture (square in the example illustrated) 75 adapted to receive the correspondingly shaped non-round (square in the example illustrated) rearwardly projecting male coupling element 57 of any one of the power tool shafts 51 of any one of the rotary power tool means 52 in a manner such as is most clearly shown in FIGS. 1, 2, 5, and 7, whereby to effectively couple the driving motor 66 to the selected rotary power tool member 58 for rotating same whenever the motor 66 is energized.

It will be noted that the coupling means 68 is effectively provided with controllably operable catch means, indicated generally at 76, for retaining it in a rearwardly retracted relationship such as is clearly shown in FIG. 8 and adapted to be controllably disengaged to allow the biasing spring means 73 to extend the slidable member 69 and the forward coupling element 74 forwardly into the engaged relationship clearly shown in FIGS. 1, 2, 5, and 7 when said catch means 76 is controllably unfastened.

In the exemplary first form of the invention illustrated, said catch means 76 comprises a spring member 78 fastened as indicated at 79 to the slidable member 69 and having a downwardly or inwardly directed projection member 81 adapted to be received in a detent aperture 82 carried by the member 71. The rear end of the spring member 78 is provided with a thumb or finger operating portion 83 adapted to be digitally engaged and forcibly moved outwardly so as to remove the inwardly directed projection 81 from the turns of the biasing spring 73 so that the slidable member 69 can be forcibly moved rearwardly or toward the left, as shown in FIG. 7, into the position shown in FIG. 8 where the actuating end 83 can be released to allow the inward projection 81 to engage the detent slot 82, as is clearly shown in FIG. 8, which will thus hold the forward coupling element 74 in a disengaged relationship with respect to the corresponding rearwardly projecting coupling element 57 of any one of the power tool shafts 51.

When the coupling means 68 is in the disengaged relationship shown in FIG. 8, it will be understood that the turret wheel means 21 can be freely rotated, by way of the pivotal mounting means 23, so as to move any selected other one of the plurality of rotary power tool means 52 into alignment with the disengaged coupling means 68 so that, upon release thereof by unlocking the catch member 78, the coupling element 74 will be moved forwardly by the biasing spring 73 into engaged and drivingly coupled relationship with the rearwardly coupling element 57 of the shaft 51 of the newly selected rotary power tool means 52 so that it can be driven when the motor 66 is energized.

It will be understood that the above-described exemplary first form of the invention provides an arrangement which makes it possible to quickly select any desired one of the plurality of power tool means 52 and to place it in driven relationship with respect to the motor 66. This operation can be effected in a matter of seconds and does not involve any of the complicated and time-consuming procedures conventionally employed in prior art practice for changing rotary power tools relative to a driving motor.

Incidentally, it should be noted that any type of rotary power tool means 52 may be employed. In the exemplary first form of the invention illustrated in FIGS. 1–9 the power tool means 58 is shown as comprising a grinding wheel, the power tool means 59 is shown as comprising a conventional chuck for firmly grasping the base portion of a drill bit or any other similar rotary tool element, and the power tool member 61 is shown as comprising another grinding wheel, perhaps of a different degree of coarseness from the first-mentioned grinding wheel 58. However, it should be noted that these are merely exemplary, and virtually any type of rotary power tool means may be mounted in lieu thereof.

Incidentally, it should be noted that in the exemplary first form of the invention illustrated in FIGS. 1–9 the power transmission means, indicated generally at 62, is shown as being properly positioned with respect to the rear surface of the rotary turret wheel means 21 by reason of the fact that it is fastened by the fastening sleeve 63 and set screw 67 to the output shaft 65 of the driving motor 66, which is rigidly fastened by the base portion 84 to the auxiliary horizontal supporting table member 43 at an appropriate location with respect to the fastening of the bottom end 44 of the carrying member 27 to said table member 43 by said connection means 42. However, the invention is not limited to this arrangement, and an additional mounting means for directly mounting the power transmission means 62 relative to the supporting table member 43 may be employed in lieu of using the motor 66 for mounting same.

FIGS. 10–12 illustrate a slight modification of the invention with respect to the mode of coupling engagement and disengagement of the power transmission means relative to the selected one of the rotary power tool means. Because of the similarity of this modification to the first form of the invention illustrated in FIGS. 1–9 and described in detail hereinbefore, similar reference numerals, primed, however, are employed for designating corresponding parts of this modified form of the invention.

It will be noted that in this modified form of the invention, the coupling means 68' comprises the fastening sleeve 63', which is rigidly fastened to the motor output shaft 65' and which has the forwardly projecting keyed or non-round coupling element 74' (comprising a flat spatulate semicylindrical key member in the modification illustrated). It should also be noted that the coupling element 57' carried by the rear end of the rotary power tool shaft 51' is provided with a corresponding receiving slot 85 adapted to receive the semicylindrical flat key member 74' in the manner most clearly shown in FIG. 11 whereby to provide driving engagement between the driving motor 66' and any selected one of the plurality of rotary power tool means 52'.

In order to provide for controllable engagement and disengagement of the coupling key 74' and slot 85, as shown in FIG. 11, the carrying member 27' is mounted with respect to the horizontal supporting table member 43' in a manner such as to allow the rotary turret wheel means 21' to be effectively moved in a manner such as to move the rear coupling element 57' of the power tool shaft 51' away from the coupling key 74'. This disengaged relationship is clearly shown in FIG. 12. In the exemplary modification illustrated in FIGS. 10–12 this type of movement is provided by a base portion 86 of the carrying member 27' which is provided with an offset locking pin 88 adapted to be received within an offset aperture 87 in the horizontal supporting table member 43' and, when so received, adapted to lock the apparatus in the engaged relationship clearly shown in FIGS. 10 and 11. However, when the locking pin 88 is removed from the locking aperture 87, the entire carrying member 27' and rotary turret wheel means 21' can be rotated about the vertical axis of the vertical fastening screw 45' which, in this case, is so connected as to effectively provide what might be functionally called vertical pivot pin means rotatively mounting said carrying member 27' with respect to the supporting table 43' for rotation about a vertical axis. Said rotation will normally be in a counter-clockwise direction as the apparatus is seen in top plan view and this will clearly disengage the coupling elements in the manner best shown in FIG. 12 so as to allow the rotary turret wheel means 21' to be rotated to a new position with a new rotary power tool means 52' at the horizontal level of the coupling key 74', after which the entire carrying member 27' and rotary turret wheel means 21' can be rotated around the vertical pivot pin means 45' from the disengaged relationship shown in FIG. 12 into the engaged relationship shown in FIGS. 10 and 11, and the locking pin 88 can then be reinserted in locking relationship within the locking hole or aperture 87 so that the apparatus is ready for operation.

It should be understood that the figures and the specific description thereof set forth in this application are for the purpose of illustrating the present invention and are not to be construed as limiting the present invention to the precise and detailed specific structure shown in the figures and specifically described hereinbefore. Rather, the real invention is intended to include substantially equivalent constructions embodying the basic teachings and inventive concept of the present invention.

We claim:

1. A multiple quick-change rotary power tool mounting and coupling apparatus for coupling any of a plurality of rotary power tools with respect to an output shaft of a driving motor, comprising: rotary turret wheel means provided with pivotal mounting means pivotally connected to said rotary turret wheel means substantially at the center thereof and rotatively mounting said rotary turret wheel means in a predetermined plane for rotation about an axis substantially perpendicular to said plane, said pivotal mounting means being provided with a carrying member provided with connection means cooperable for rigid connection with respect to an auxiliary supporting member for firmly carrying said rotary turret wheel means in a predetermined operative work region lying in said predetermined plane for rotation about said axis substantially perpendicular thereto; said rotary turret wheel means being provided with a plurality of circularly spaced rotary-power-tool-mounting means cooperable for receiving and rotatably mounting in a longitudinally fixed and longitudinally axially directed position substantially parallel to said first-mentioned axis of rotation of said rotary turret wheel means any of a plurality of interchangeable and replaceable rotary power tool shafts, each being fixedly provided at a longitudinally spaced location with a rotary power tool member adapted to rotate together with said shaft in a plane longitudinally outwardly offset from, and substantially parallel with respect to, said predetermined plane of rotation of said rotary turret wheel means; and rotary power transmission means provided with fastening means cooperable for rigid fastening attachment with respect to an output shaft of a driving motor and provided with effectively controllably engageable and disengageable coupling means directed toward said rotary turret wheel means at a radial distance from said pivotal mounting means and said axis of rotation of said rotary turret wheel means substantially equal to the radial spacing of each of said rotary-power-tool-mounting means from said axis of rotation of said rotary turret wheel means and controllably engageable and disengageable with respect to any one of said interchangeable and replaceable rotary power tool shafts.

2. Apparatus as defined in claim 1, wherein said coupling means comprises a member having a forward end provided with a rotatively keyed coupling element cooperable with, and adapted to be effectively engaged by, the rear end of any one of said rotary power tool shafts and in rotative driving relationship with respect thereto.

3. Apparatus as defined in claim 1, wherein said coupling means comprises a member having a forward end provided with a rotatively keyed coupling element cooperable with, and adapted to be effectively engaged by, a corresponding rearwardly directed coupling element carried by the rear end of any one of said rotary power tool shafts and in rotative driving relationship with respect thereto.

4. Apparatus as defined in claim 1, wherein said coupling means comprises a member having a forward end provided with a rotatively keyed coupling element projectingly cooperable with, and adapted to be received by, a corresponding rearwardly directed coupling element carried by the rear end of any one of said rotary power tool shafts and in rotative driving relationship with respect thereto.

5. Apparatus as defined in claim 1, wherein said coupling means comprises a slidably mounted member provided with spring biasing means normally biasing it forwardly and provided with controllably operable catch means for retaining it in a rearwardly retracted relationship, said member having a forward end provided with a rotatively keyed coupling element cooperable for rotative driving engagement with respect to the rear end of any one of said rotary power tool shafts.

6. Apparatus as defined in claim 1, wherein said coupling means comprises a slidably mounted member provided with spring biasing means normally biasing it forwardly and provided with controllably operable catch means for retaining it in a rearwardly retracted relationship, said member having a forward end provided with a rotatively keyed coupling element receivingly cooperable for rotative driving engagement with respect to a corresponding rearwardly directed coupling element carried by the rear end of a selected one of said rotary power tool shafts.

7. Apparatus as defined in claim 1, wherein said rotary turret wheel means is effectively mounted by said carrying member for controllable relative movement of a selected one of said rotary-power-tool-mounting means forwardly away from said coupling means of said rotary power transmission means into an effective rotary power tool shaft disengagement position where said coupling means will be effectively disengaged from rotative driving engagement with respect to the rear end of a selected one of said rotary power tool shafts adapted to be carried by said selected one of said rotary-power-tool-mounting means, said rotary turret wheel means being also mounted for effective reverse movement into a rotary power tool shaft engagement position where said coupling means will be effectively engaged in rotative driving engagement with respect to said rear end of said selected one of said rotary power tool shafts adapted to be carried by said selected one of said rotary-power-tool-mounting means.

8. Apparatus as defined in claim 1, wherein said rotary turret wheel means is effectively mounted by said carrying member for controllable relative movement of a selected one of said rotary-power-tool-mounting means forwardly away from said coupling means of said rotary power transmission means into an effective rotary power tool shaft disengagement position where said coupling means will be effectively disengaged from rotative driving engagement with respect to the rear end of a selected one of said rotary power tool shafts adapted to be carried by said selected one of said rotary-power-tool-mounting means, said rotary turret wheel means being also mounted for effective reverse movement into a rotary power tool shaft engagement position where said coupling means will be effectively engaged in rotative driving engagement with respect to said rear end of said selected one of said rotary power tool shafts adapted to be carried by said selected one of said rotary-power-tool-mounting means; and including locking means for controllably effectively locking said rotary turret wheel means with respect to said auxiliary supporting member whereby to prevent said movement of said rotary turret wheel means and said selected one of said rotary-power-tool-mounting means into said rotary power tool shaft disengagement position.

9. Apparatus as defined in claim 1, wherein said rotary turret wheel means is effectively mounted by said carrying member for controllable relative movement of a selected one of said rotary-power-tool-mounting means forwardly away from said coupling means of said rotary power transmission means into an effective rotary power tool shaft disengagement position where said coupling means will be effectively disengaged from rotative driving engagement with respect to the rear end of a selected one of said rotary power tool shafts adapted to be carried by said selected one of said rotary-power-tool-mounting means, said rotary turret wheel means being also mounted for effective reverse movement into a rotary power tool shaft engagement position where said coupling means will be effectively engaged in rotative driving engagement with respect to said rear end of said selected one of said rotary power tool shafts adapted to be carried by said selected one of said rotary-power-tool-mounting means; and including locking means for controllably effectively locking said carrying member and said rotary turret wheel means with respect to said auxiliary supporting member whereby to prevent said movement of said rotary turret wheel means and said selected one of said rotary-power-tool-mounting means into said rotary power tool shaft disengagement position.

10. A multiple quick change rotary power tool mounting and coupling apparatus for coupling any of a plurality of rotary power tools with respect to an output shaft of a driving motor, comprising: rotary turret wheel means of substantially circular disk-shaped configuration provided with horizontally directed pivotal mounting means pivotally connected to said rotary turret wheel means substantially at the center thereof and rotatively mounting said rotary turret wheel means in a predetermined vertical plane for rotation about a substantially horizontal axis, said pivotal mounting means being provided with a downwardly directed carrying member provided at the bottom end thereof with connection means cooperable for rigid connection with respect to an auxiliary horizontal supporting table member for firmly carrying said rotary turret wheel means in a predetermined operative work region lying in said predetermined vertical plane for rotation about said horizontal axis; a plurality of interchangeable and replaceable rotary power tool means, each comprising a rotary power tool member provided with a rearwardly directed longitudinal shaft fixedly mounting said power tool member at the front end thereof for rotation in a plane perpendicular thereto and having a coupling element at the rear end thereof and behind said rotary turret wheel means when mounted thereon; said rotary turret wheel means being provided with a plurality of circularly spaced rotary-power-tool-mounting bearing means, each cooperable for receiving and rotatably mounting in a longitudinally fixed and longitudinally axially directed position substantially parallel to said first-mentioned axis of rotation of said rotary turret wheel means any of the longitudinal shafts of any of said rotary power tool means in a manner mounting the corresponding rotary power tool member for rotation in a vertical plane forwardly offset from the vertical plane of rotation of said rotary turret wheel means; and rotary power transmission means provided with fastening means cooperable for rigid fastening attachment with respect to a horizontally directed output shaft of a driving motor and provided with effectively controllably engageable and disengageable coupling means horizontally forwardly directed toward the rear surface of an annular portion of said rotary turret wheel means at a radial distance from said pivotal mounting means and said horizontal axis of rotation of said rotary turret wheel means substantially equal to the radial spacing of each of said rotary-power-tool-mounting bearing means from said horizontal axis of rotation of said rotary turret wheel means and controllably horizontally engageable and disengageable with respect to the coupling element carried by the rear end of any one of said interchangeable and replaceable rotary power tool shafts.

11. Apparatus as defined in claim 10, wherein said coupling means comprises a member having a forward end provided with a rotatively keyed coupling element cooperable with, and adapted to be effectively engaged by, the rearwardly directed coupling element carried by the rear end of a selected one of said rotary power tool shafts and in rotative driving relationship with respect thereto.

12. Apparatus as defined in claim 10, wherein said coupling means comprises a member having a forward end provided with a rotatively keyed coupling element projectingly cooperable with, and adapted to be received by, the corresponding rearwardly directed coupling element carried by the rear end of a selected one of said rotary power tool shafts and in rotative driving relationship with respect thereto.

13. Apparatus as defined in claim 10, wherein said coupling means comprises a horizontally slidably mounted member provided with spring biasing means normally biasing it forwardly and provided with controllably operable catch means for retaining it in a rearwardly retracted relationship, said member having a forward end provided with a rotatively keyed receiving coupling element receivingly cooperable for rotative driving engagement with respect to the corresponding rearwardly directed coupling element carried by the rear end of a selected one of said rotary power tool shafts.

14. Apparatus as defined in claim 10, wherein said coupling means comprises a horizontally slidably mounted member provided with spring biasing means normally biasing it forwardly and provided with controllably operable catch means for retaining it in a rearwardly retracted relationship, said member having a forward end provided with a rotatively keyed receiving coupling element receivingly cooperable for rotative driving engagement with respect to the corresponding rearwardly directed coupling element carried by the rear end of a selected one of said rotary power tool shafts, the rearwardly directed coupling element carried at the rear end of each of said rotary power tool shafts comprises a rearwardly directed and projecting non-round shaft portion, said forwardly directed coupling element of said coupling means comprising a non-round rotatively keyed apertured receiver means having a shape substantially similar to the shape of said rearwardly projecting non-round rotatively keyed coupling element carried at the rear end of any selected one of said rotary power tool shafts.

15. Apparatus as defined in claim 10, positively including in combination therewith said driving motor and said output shaft thereof in fastened relationship with respect to said fastening means at the rear end of said rotary power transmission means.

References Cited by the Examiner

UNITED STATES PATENTS

| | | | |
|---|---|---|---|
| 2,567,127 | 9/1951 | Shoffner | 74—16 X |
| 2,603,975 | 7/1952 | Shoffner | 74—16 |
| 2,859,627 | 11/1958 | Gallop | 74—16 |

FOREIGN PATENTS 1,042,196  6/1953  France.

MILTON KAUFMAN, *Primary Examiner.*

FRELING E. BAKER, *Examiner.*